April 1, 1958 M. S. GLASS ET AL 2,829,306

OSCILLATING ELECTRICAL CIRCUITS

Filed April 13, 1953

INVENTORS: M. S. GLASS
L. R. WALKER

BY [signature]

ATTORNEY

United States Patent Office 2,829,306

Patented Apr. 1, 1958

2,829,306

OSCILLATING ELECTRICAL CIRCUITS

Myron S. Glass, West Orange, and Laurence R. Walker, Bernardsville, N. J., assignors to Bell Telephone Laboratories, Incorporated, New York, N. Y., a corporation of New York Application April 13, 1953, Serial No. 348,526

2 Claims. (Cl. 315—39.75)

Figure 1:
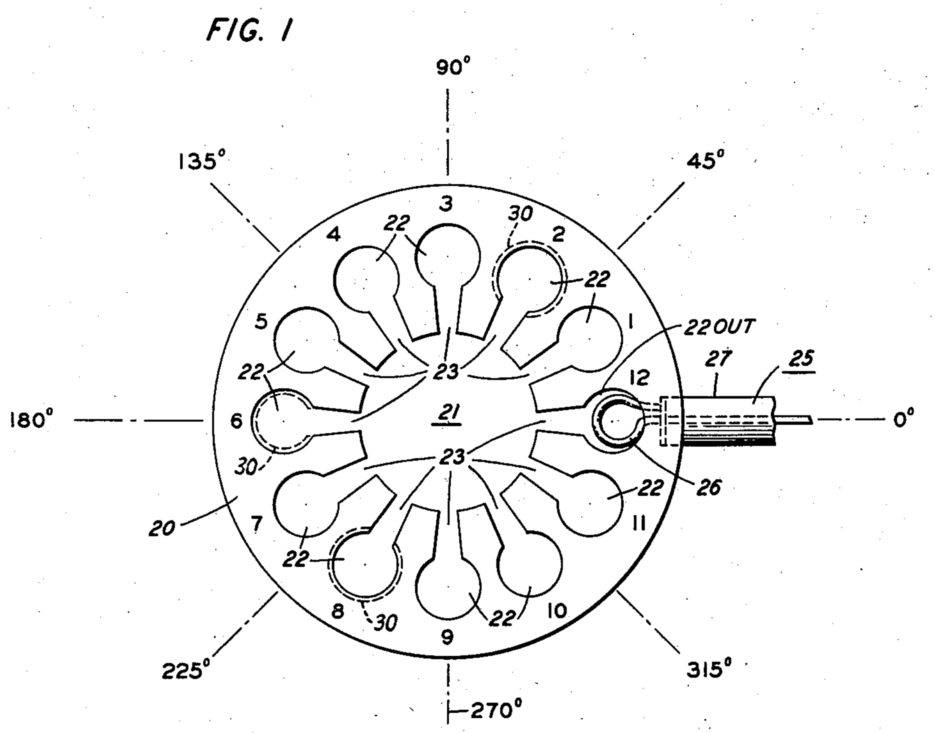

This invention relates to oscillating electrical circuits comprising a series of coupled circuits, and more particularly to the control of perturbations which may be introduced into such circuits to secure a desired orientation of the standing wave pattern of a particular mode of oscillation. Such circuits may be of many types, one illustrative type being circuits employed in multi-cavity magnetrons.

It is known that a transmission line or filter, formed of joining together in tandem a number of identical electrical circuits, possesses certain transmission modes. Each of these is characterized by the fact that the current, or voltage, measured at a given point in one of the circuits has a definite ratio to the current, or voltage, measured at the congruent point in the preceding circuit. Within the frequency pass band of the filter this ratio is of the form, $e^{j\Phi}$, where $\Phi$ is a real number called the phase shift per section. For N sections the total phase shift becomes $N\Phi$. If the time variation of the impressed signal is of the form $e^{j\omega t}$, it is pemissible and convenient to say that the filter propagates a traveling wave; as is well known $e$ is the base of Naperian logarithms, $j=\sqrt{-1}$, $\omega=2\pi f$ where $f$ is the frequency of an applied signal, and $t$ is time. The direction of propagation is said to be positive when $\Phi$ is negative; negative when $\Phi$ is positive.

When the extremities of such a filter of N sections are joined together to form a ring, it is clear that the total phase shift must be $N\Phi=2m\pi$, where $m$ is an integer. Such a ring will, therefore, propagate only frequencies such that $\Phi=2m\pi/N$. The frequencies characterized by the numbers, $m$, are the resonant frequencies of the ring. The associated patterns of excitation are the resonant modes of the ring.

It is known also that if at any frequency the phase shift of a mode is $\Phi$ there also exists a mode with phase shift of $-\Phi$. Thus the resonant modes, $m$ and $-m$, have in general the same frequency and are said to be degenerate. If N is even, the modes, $n=N/2$ and $m=0$, do not follow this rule since for them $\Phi=\pi$, or 0, respectively. Since $e^{j\pi}=e^{-j\pi}$ and $e^{j0}=e^{-j0}$, these two modes of the system cannot be distinguished. Hence the $\pi$-mode is not degenerate.

When the ring is excited at the frequency of a degenerate mode, traveling waves corresponding to both the $+m$ and $-m$ components will be present, and the total excitation may be regarded as a standing wave pattern resulting from the superposition of the two traveling wave patterns. In practice, the existence of unavoidable differences between the individual circuits produce perturbations in the ring, which affect the $+m$ and $-m$ modes differently. This gives rise to two new resonant frequencies slightly different from the frequency of the degenerate mode, and two different patterns of excitation. The orientation of these patterns depends upon the nature and distribution of these perturbations in the ring.

For convenience we refer to this double frequency mode as a doublet mode.

If the phase change $\Phi$, associated with one individual circuit at the frequency of the doublet mode, differs from the phase change of the other, uniform circuits, this difference will introduce a perturbation at that point in the ring. We adopt the convention that an increase in $\Phi$ induces a perturbation of positive algebraic sign; a decrease in $\Phi$ induces a negative disturbance. The coupling by which one or more of the circuits of the ring may be connected to external circuits may also induce perturbations at the point or points of attachment. Still other causes of perturbation may be found in discontinuities, irregularities, or capacitive loading of the metallic conductors used to closely couple the ring of circuits, as for example, the straps in a strapped magnetron. Perturbations from random sources may cause undesirable orientation of the standing wave pattern of a doublet mode.

If the individual circuits comprise cavity resonators of the type employable in magnetrons, positive perturbations, in accordance with the convention described above, might include perturbations resulting from increasing the dimensions of one of the cavities in the circuit, increasing the strap capacitance, as by positioning a strap closer to the conductive member defining the resonant circuit or by strap loading, or by increasing the slot capacitance of a resonant cavity, as by decreasing the slot width. Conversely negative perturbations that might be introduced into a circuit of this type include decreasing the cavity dimensions, decreasing the strap capacitance; or decreasing the slot capacitance. If the unwanted perturbation is frequency dependent, and the circuit is of the magnetron type and tunable by the insertion of tuning pins into each of the resonators, the perturbations may comprise either increasing or decreasing the diameters of certain tuning pins, as disclosed in an application Serial No. 348,218, filed April 13, 1953, of J. P. Molnar and an application Serial No. 348,365, filed April 13, 1953, of M. S. Glass, now Patent 2,797,361, issued June 25, 1957.

It may be useful to distinguish between various types of perturbations or asymmetries that may be present in the anode circuit of a magnetron. A first type of asymmetry we may consider as a random constructional asymmetry which may be due to irregularities in the construction of the magnetron and over which a magnetron designer has no control. A second type of asymmetry we may consider as an unavoidable design asymmetry that the magnetron designer is forced to introduce in order to attain some larger goal; the asymmetry introduced by the output coupling is of this type. A third type of asymmetry we may consider as a compensating asymmetry; such an asymmetry, in accordance with an aspect of our invention, is introduced in order to compensate specifically for the effects of unavoidable design asymmetries. It should also be noted that each of these asymmetries or perturbations may be measured and evaluated in various ways. Generally in the below description we have discussed these asymmetries in terms of admittances of equivalent circuits. However, each such disturbance may also be considered and evaluated in terms of the traveling electrical wave it introduces into the anode and in terms of the magnitude and angular phase of that wave.

It is an object of this invention to provide systematic means of introducing perturbations or asymmetries into the ring of circuits so that the standing wave patterns of the doublet mode may be oriented in a controlled manner.

It is a further object of the invention effectively to cancel out or reduce the effects of undesired perturbations, or to augment the effects of desired perturbations at will, for the purpose of attaining proper orientation of the standing wave pattern of the doublet modes in a manner which shall cause only negligible disturbance of the principal mode of oscillation.

It is a further object of this invention to provide means of introducing a virtual effect equivalent to a suitable perturbation at the proper angular location, to achieve proper orientation of doublet mode wave patterns, when no modifiable circuit is located in the required angular relation to the point of reference.

It is a further object of this invention to introduce a virtual effect equivalent to a suitable perturbation at the proper angular location and to achieve proper orientation of doublet mode wave patterns by the summation of effects of perturbations introduced elsewhere in the ring of resonators in a specific and predetermined manner. This summation may include the reactance introduced by an external circuit.

It is a further object of this invention to achieve proper orientation of doublet mode wave patterns, equivalent to the introduction of large perturbations at specified points in the ring of resonators, by the summation of effects of perturbations differing in algebraic sign to achieve mutual cancellation of effects upon the principal mode of oscillation, but so chosen and so located that their effects upon the orientation of the doublet mode wave pattern are additive.

It is a further object of this invention to correlate the several effects of magnitude, algebraic sign, and angular position of variously disposed perturbations, in various combinations in accordance with this aspect of this invention, to achieve the re-enforcement of effects upon orientation of doublet mode wave patterns, and simultaneously to achieve cancellation of effects upon the principal mode of oscillation.

It is a further object of this invention to achieve suppressive loading of a doublet mode of oscillation in a ring of closely coupled circuits and to provide conditions favorable to the desired mode of oscillation of the system.

These and other objects of this invention are attained in specific embodiments in which the perturbations or asymmetries present or acting upon the circuit are related to each other in predetermined manners and, more specifically, in accordance with a given mathematical relationship. While not limited thereto, it is believed that the invention and its various features and aspects may be most readily understood from a consideration of the mathematical relationship involved.

In order to deduce the mathematical formula, from which may be appreciated the features of the method of the invention, we may treat each circuit in a ring of circuits as a four terminal network, treat the complete system as a closed ring of such networks and assume that any non-uniformity introduced into this otherwise uniform system takes the form of a small shunt admittance, $y_r$, inserted between the $r^{th}$ and $(r+1)^{th}$ circuit of the ring. Here $r$ is an ordinal number which identifies the position of the circuit in the ring. The equations for this ring of networks are set up in matrix algebra notation for convenience and there are then introduced into the equations the shunt admittance, $y_r$, and also the conditions for a voltage maximum in the standing wave pattern of the doublet mode. After some manipulation, the network equations may be reduced to a single equation which defines the angular distance, from any arbitrary reference point, to a maximum point in the standing wave pattern of the doublet mode:

$$\tan 2r_{max}\,\psi_m=\frac{\sum y_r \sin 2r\psi_m}{\sum y_r \cos 2r\psi_m} \qquad (1)$$

In this equation any reactive disturbance, $y_r$, is assumed to be located at angular distance $r\Psi_m$ from an arbitrarily chosen reference point in the ring. The angular distance from this same reference point to a voltage maximum in the standing wave pattern of the doublet mode is represented by $r_{max}\Psi_m$. The unit of angular distance $\Psi_m$ is defined by the equation $$\psi_m=\frac{2\pi}{N}\left[\frac{N}{2}-m\right] \qquad (2)$$

where N is the total number of circuits in the ring and $m$ is the number of the doublet mode. The doublet mode with which most concern is generally felt is that mode closest in frequency to the $\pi$-mode of oscillation in which case the expression $(N/2-m)$ will be equal to 1.

It is evident that various perturbations $y_{r1}$, $y_{r2}$, $y_{r3}$, etc. may be inserted in the ring of resonators at positions defined by the angular distances, $r_1\Psi_m$, $r_2\Psi_m$, $r_3\Psi_m$, etc. It develops from Equation 1 that the angular position of a maximum voltage point in the standing wave pattern of the doublet mode, as defined by the tangent function $\tan 2r_{max}\Psi_m$, is determined by the summation of the various perturbations multiplied by trigonometric functions of twice their angular distances from the same arbitrary reference point. From a knowledge of the sine and cosine functions, it is immediately recognized that the effect of an introduced disturbance, $y_r$, may be varied both in magnitude and in algebraic sign by varying its position with respect to the reference point.

It is also evident that while $r$ was introduced into the equation as an ordinal number with integral values, it is not restricted to integral values in the final equation, where the quantity $r\Psi_m$ merely represents angular distance. Thus it is possible to introduce the disturbances anywhere in the ring of resonators, and $r$ may have any value from 0 to N, where N is the number of resonators. If $y_r$ is introduced by modification of the resonators, $r$ will have integral values; if introduced in other ways, as by capacitive loading or discontinuity of the straps, $r$ will not be limited to integral values.

It is known that if an external circuit is attached at a point in the ring of circuits which is spaced 45 angular degrees from a maximum voltage point of the standing wave pattern of the doublet mode, the two components of this mode will be equally coupled to the external circuit. This is the condition desired for repressive loading of the unwanted mode. Employing the symbols which we have used in the development of Equation 1 and placing the point of reference at the point of attachment of the external circuit, the condition for equal loading of the mode components may be expressed by the formula:

$$r_{max}\Psi_m=45°$$

From this it follows that $$\tan 2r_{max}\Psi_m=\tan 90°=\infty \qquad (3)$$

Combining Equation 3 with Equation 1 gives the new equation $$\frac{\sum y_r \sin 2r\psi_m}{\sum y_r \cos 2r\psi_m}=\infty \qquad (4)$$

Equation 4, which we have derived as a corollary of Equation 1 by inserting the condition for equal loading of the two mode components, is in convenient form for analysis and consideration. It is evident that this equation is satisfied if the numerator of the fractional term has any finite value and the denominator is zero. It is approximately satisfied if the numerator is substantially large and the denominator is vanishingly small. To satisfy these requirements there can be selected values of $y_r$ and of $2r\Psi_m$ of suitable magnitude and algebraic sign so that the terms of the summation in the numerator are large and additive while the terms in the denominator are very small or of unlike sign so that they cancel.

With the equations derived and disclosed above as background certain of the various desirable features and other aspects of this invention can be set forth.

From a consideration of the above discussion, it is apparent that any perturbation spaced 180 degrees from a given perturbation and of like sign will augment the effect of the first perturbation with respect to the orientation of a doublet mode. Thus the two perturbations may themselves be individually of small magnitude so that their individual and combined effects do not appreciably disturb the principal mode of oscillation of the system, while they exert an additive effect upon the orientation of a doublet mode pattern equivalent to a larger single perturbation located at either of the two points. This manner of employing perturbations at two points in a magnetron circuit located 180° apart to prevent moding by properly orienting the doublet mode wave pattern is set forth in an application Serial No. 348,438, filed April 13, 1953, of R. C. Fletcher and S. Millman, now Patent 2,797,362, issued June 25, 1957.

When the doublet mode wave pattern is oriented by the introduction of perturbations as set forth in that application and discussed further below, it is advantageous and often requisite that the effect of the various perturbations in the magnetron be considered. These perturbations include the unwanted perturbation introduced by the output system coupled to the oscillating electrical circuit which should be cancelled so as not to interfere with or prevent this manner of mode orientation, and the introduced disturbances or perturbations whose effect on the main or $\pi$-mode of oscillation should also be cancelled.

In accordance with one feature of this invention the effect of an unwanted perturbation on the orientation of a doublet mode pattern may be cancelled out by the introduction of a perturbation of the same magnitude and algebraic sign and spaced 90 angular degree from the unwanted perturbation. Such an unwanted perturbation may be due to the reactance introduced in the output circuit from the ring of resonators of a magnetron circuit. One specific structure comprising a tunable magnetron in which the output reactance is cancelled in accordance with this feature of this invention by varying the dimensions of tuning pins insertable into resonators of a magnetron located 90 angular degrees from the output is disclosed in an application Serial No. 348,365, filed April 13, 1953, by M. S. Glass, now Patent 2,797,361, issued June 25, 1957. It is apparent from the above discussion that two smaller perturbations could be located spaced 90 and 270 degrees, respectively, from the unwanted perturbation and that their effects would be additive in cancelling its effect.

Another feature of the invention is the introduction of a pair of perturbations of opposite algebraic sign and spaced by 90 angular degrees within the ring of circuits. In this configuration, and with the unlikeness of algebraic sign, the two perturbations exert an additive effect upon the orientation of the doublet mode wave pattern. As a result of the unlikeness of algebraic sign the effect of the two disturbances upon the frequency of oscillation of the normal mode of the system will tend to cancel.

Another feature of the invention, which follows as a corollary of the above, is the introduction of a pair of perturbations of like algebraic sign and mutually spaced by 180 angular degrees within the ring of circuits, and the added introduction of another pair also mutually spaced by 180 angular degrees and of like sign, the second pair being of opposite algebraic sign from, and spaced by 90 angular degrees from, the first pair. In this configuration and distribution of algebraic sign, the effects of the four perturbations upon the orientation of the doublet mode wave pattern are additive. Their effects upon the frequency of oscillation of the principal mode will tend to cancel.

A still further feature of the invention consists in the introduction, into a ring of circuits, of a plurality of perturbations of suitable magnitudes and algebraic sign, both of which may differ among the several disturbances. These perturbations are so disposed about the ring that the summation $\Sigma y_r \sin 2r\Psi_m$ is additive, while the summation $\Sigma y_r \cos 2r\Psi_m$ is subtractive and tends to cancel or to become vanishingly small. In these summations, each $y_r$ is a perturbation introduced at a particular angular spacing $r\Psi_m$, from a reference point in the ring, which may be conveniently one of the circuits. The effect of this configuration of perturbations and distribution of their algebraic sign will be to so orient the doublet mode wave pattern that its two components will be equally coupled to an external circuit attached at the point of reference. This provides repressive loading of the doublet mode. It follows as a corollary that the perturbation introduced by the attached external circuit may be treated as one of the plurality of disturbances and included in the summation.

Certain of the features described above can be readily understood by consideration of Equation 4 and particularly by inserting therein the values of the sine cosine functions of twice 90 angular degrees (180°) and twice 180 angular degrees (360°). The features of addition and cancellation which we have associated with those angular spacings arise from the following trigonometric relations:

$$\sin(\theta+180°)=-\sin\theta$$
$$\cos(\theta+180°)=-\cos\theta$$
$$\sin(\theta+360°)=\sin\theta$$
$$\cos(\theta+360°)=\cos\theta$$

In these relations $\theta$ may be any angle.

A further understanding of this invention and of these and various other features thereof may be gained from consideration of the following descripiton and the accompanying drawing, the two figures of which depict a resonator system of the type employable in certain well known magnetron types, of which that described in Patent 2,657,334, issued October 27, 1953, of J. W. West is an example. The resonator system comprises a conductive block 20 having a central aperture 21 therein, and a plurality resonator bores therethrough, the bores 22 being located around the central aperture 21 and communicating therewith by resonator slots 23, as is known in the art. In the specific embodiment depicted it is assumed, for purposes of this explanation, that there are twelve bores 22 but it is apparent that this invention is not limited to any number of bores or any particular type of resonator system.

Referring now to Fig. 1, one of the resonator bores 22 is connected to an external circuit 25 by some output connector which may be a wave guide transformer section, as in the above-mentioned West application, or an inductive coupled loop 26 and coaxial lead 27. The connection of the external circuit 25 to the resonant system introduces a reactance or perturbation into the associated resonator 22 Out and the magnitude of this reactance cannot be conveniently controlled. In order to attain the desired orientation of the doublet mode closest in frequency to the $\pi$-mode of oscillation, which doublet mode in this embodiment is the 5-mode, the standing wave patterns of the doublet mode must be predetermined by varying the geometry or the properties of certain of the individual circuits in the system. In application Serial No. 348,438, filed April 13, 1953, of R. C. Fletcher and S. Millman, now Patent 2,797,362, issued June 25, 1957, it is proposed to obtain the desired mode orientation by varying the dimensions of the resonator bores substantially 45 and 225 degrees from the output bore 22 Out. This method assumes that the magnitude of the reactance introduced by the output circuit is small, so that it will be, in effect, overwhelmed by the perturbation introduced in these bores and, secondly, that bores will be located at the requisite angular distances from the output bore. In this embodiment we will asume that the external circuitry introduces a very large reactance so that no reactance can be placed in the bores approximately 45 and 225 degrees from the output resonator to orient the doublet 5-mode without being so large as to interfere with the orientation of the desired $\pi$-mode as well. Further, as is apparent, in this configuration of resonators, none is located either at 45 angular degrees or 225 angular degrees with respect to the point of coupling of the external circuit 25. For both these reasons the modification of resonators taught in the above-mentioned Fletcher-Millman application is precluded for this resonant system.

In accordance with one aspect of our invention, resonators with suitable angular distribution in the ring of resonators are chosen and modified by the introduction of perturbations of appropriate magnitude and algebraic sign so that this perturbation in the ring of resonators together with the reactance introduced by the external circuit satisfy the condition imposed by Equation 4. In this manner equal loading of the two components of the doublet mode is attained and moding prevented.

One specific modification of the resonator system of the drawing to attain this result will further illustrate the application of certain features of this invention. In the embodiment depicted a reactance, $y_{12}$, has been introduced into the No. 12 or output resonator 22 Out by the coupling of the external circuit. The trigonometric functions pertinent to an analysis of this particular structure comprising twelve resonator bores are given in the following table, assuming $m=5$:

| $r$ | $r\psi_m$ | $2r\psi_m$ | $\sin 2r\psi_m$ | $\cos 2r\psi_m$ |
|---|---|---|---|---|
| 0 or 12 | 0 | 0 | 0 | 1 |
| 1 | 30 | 60 | $\sqrt{3}/2$ | ½ |
| 2 | 60 | 120 | $\sqrt{3}/2$ | −½ |
| 3 | 90 | 180 | 0 | −1 |
| 4 | 120 | 240 | $-\sqrt{3}/2$ | −½ |
| 5 | 150 | 300 | $-\sqrt{3}/2$ | ½ |
| 6 | 180 | 360 | 0 | 1 |
| 7 | 210 | 420 | $\sqrt{3}/2$ | ½ |
| 8 | 240 | 480 | $\sqrt{3}/2$ | −½ |
| 9 | 270 | 540 | 0 | −1 |
| 10 | 300 | 600 | $-\sqrt{3}/2$ | −½ |
| 11 | 330 | 660 | $-\sqrt{3}/2$ | ½ |
| 0 or 12 | 360 | 720 | 0 | 1 |

In accordance with our invention, the desired orientation of the doublet 5-mode wave pattern can be achieved by introducing into the No. 2 and No. 8 resonators perturbations similar to the reactance introduced by the output circuit. The conditions for equal loading of a doublet mode were given in Equation 4 and are:

$$\frac{\sum y_r \sin 2r\psi_m}{\sum y_r \cos 2r\psi_m}=\infty$$

If we insert the pertinent values of the introduced reactances in accordance with the trigonometric functions, the particular equation for this set of conditions is $$\frac{\sqrt{3}/2(y_2+y_8)}{y_{12}-\frac{1}{2}(y_2+y_8)}=\infty$$

This equation is satisfied if $y_{12}=\frac{1}{2}(y_2+y_8)$ or if $y_2=y_8=y_{12}$.

However, we have assumed above that the reactance $y_{12}$ introduced into the output resonator bore is large so that the correction just described will unduly disturb the principal mode of oscillation. The corrective effect may therefore be enhanced by the addition of a negative perturbation, as for example, by reduction of a resonator bore, in the No. 6 resonator. The use of a negative perturbation will cancel some or all of the disturbance with respect to the principal mode of oscillation. However, because of the trigonometric functions involved, this perturbation will be of the right sign to aid in the orientation of the undesired doublet mode.

If we insert a negative value of $y_6$ and positive values of $y_2$ and $y_8$, as multiplied by the appropriate trigonometric functions, into Equation 4, we obtain $$\frac{\sqrt{3}/2(y_2+y_8)}{y_{12}-y_6-\frac{1}{2}(y_2+y_8)}=\infty$$

This equation is satisfied if $y_{12}=y_6+\frac{1}{2}(y_2+y_8)$. The magnitudes of the introduced disturbances or perturbations are therefore adjusted in accordance with our invention to suit this condition. The modifications of the three resonators are indicated by broken lines 30 in Fig. 1, which indicate the dimensions of the enlarged and smaller resonators. Advantageously, the variation in dimension of the resonator is coextensive with the height of the conductive block 20. Of course other means of introducing the perturbations may be employed.

Figure 2:
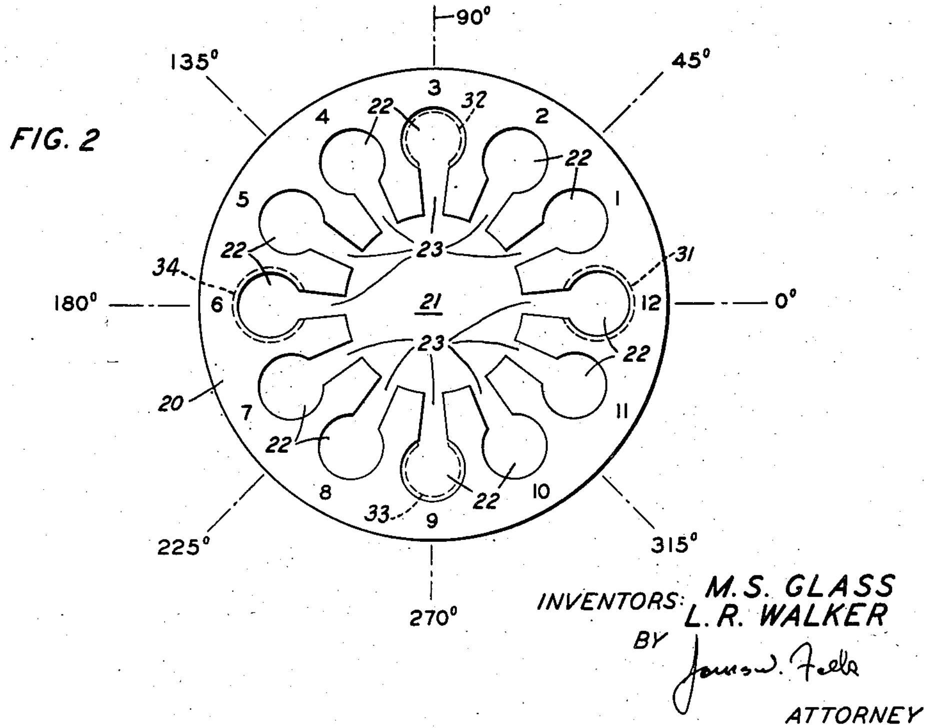

Turning now to Fig. 2 certain other features of this invention can be best illustrated with reference to that figure wherein it is assumed that a given perturbation is placed into the No. 12 resonator, whether from an external circuit or not, as shown by the broken line 31 indicating an enlarged diameter resonator. By introducing another perturbation in a resonator 90° from this first perturbation, as by a perturbation in the No. 3 resonator, shown by the broken line 32 indicating the dimensions of a smaller resonator, the effect of the perturbation in the No. 12 resonator on the orientation of a doublet mode pattern may be cancelled, if the perturbations are of the same sign and magnitude. It is to be understood in these discussions that, if it is desired only to cancel out a portion of a perturbation, that may also be readily accomplished in accordance with this invention.

If it is desired to employ a smaller perturbation in the No. 3 resonator, its effect may be augmented by utilizing also a perturbation of the same sign in the No. 9 resonator, 180° away, as shown by the broken line 33 indicating the dimensions of the No. 9 resonator, the two perturbations in the resonators 90° from the first perturbation being together of magnitude equal thereto.

Further, if it is desired to assure that the perturbations only affect the orientation of the doublet mode wave pattern but have substantially no effect upon the desired $\pi$-mode of oscillation, a fourth perturbation is introduced spaced 180° from the first and of like sign to it, the perturbation being positioned in this embodiment in the No. 6 resonator whose enlarged dimensions are indicated by the broken line 34. As the magnitudes of the perturbations are equal and of the algebraic signs and angular positions described, in accordance with this invention the effects of the four perturbations upon the orientation of the doublet mode wave pattern are additive but their effects upon the frequency of oscillation of the principal mode will substantially cancel. This is because, in terms of the mathematical discussion given above, the summation $\Sigma y_r \sin 2r\Psi_m$ is additive while the summation $\Sigma y_r \cos 2r\Psi_m$ is subtractive and substantially equal to zero.

It will also be evident to one skilled in the art that other tables of trigonometric functions may readily be prepared for systems having other than twelve resonators and for other doublet modes. With the aid of such tables one may provide in accordance with this invention combinations of corrective perturbations and angular distribution to correctly orient and repressively load a doublet mode in such systems, and thus achieve the purposes of this invention.

It is therefore to be understood that the above-described arrangements are merely illustrative of the application of the principles of the invention. Numerous other arrangements may be devised by those skilled in the art without departing from the spirit and scope of the invention.

What is claimed is:

1. A magnetron anode comprising conducting means defining a plurality of resonant cavities and a central aperture communicating therewith, said resonant cavities being disposed in a circular array around said central aperture, output means connected to said anode at one of said cavities and introducing an unavoidable design asymmetry at said one cavity producing a traveling electrical wave in said anode, and means for cancelling out the effect of said asymmetry with respect to $\pi$-mode oscillations in said anode comprising compensating asymmetries in said anode at a plurality of other cavities of said anode, said compensating asymmetries also producing traveling electrical waves in said anode and all said abovementioned waves being of such magnitudes and relative angular phases that the summation of the magnitudes of said waves times the cosine of twice their angular position from the output means is substantially zero.

2. In a magnetron, an anode structure comprising conducting means defining a plurality of resonant cavities and a central aperture communicating therewith, said resonant cavities being disposed in a circular array around said central aperture, output means connected to said anode structure at one of said cavities and introducing an appreciable unavoidable design asymmetry at said one cavity producing a traveling electrical wave in said anode, and means for orienting a doublet mode pattern of said anode structure, said means including a plurality of anode structure deformations introducing compensating asymmetries in said anode at a plurality of other cavities of said anode, said compensating asymmetries also producing traveling electrical waves in said anode and all of said waves being of such magnitude and disposition around said circular array that the summation $\Sigma y_r \sin 2r\Psi_m$ is additive while the summation $\Sigma y_r \cos 2r\Psi_m$ is subtractive and substantially zero whereby said waves orient said doublet mode wave pattern but cancel each other out with respect to the $\pi$-mode of oscillation, $y_r$ being the admittance of said asymmetries producing said waves and $\Psi_m$ their angular position from said output means.

References Cited in the file of this patent

UNITED STATES PATENTS

| | | |
|---|---|---|
| 2,474,898 | Heising | July 5, 1949 |
| 2,504,329 | Heising | Apr. 18, 1950 |
| 2,605,445 | Reich | July 29, 1952 |
| 2,635,211 | Crawford et al. | Apr. 14, 1953 |
| 2,639,405 | Benedict et al. | May 19, 1953 |
| 2,659,032 | Crawford | Nov. 10, 1953 |
| 2,679,615 | Bowie | May 25, 1954 |
| 2,766,403 | Skowron | Oct. 9, 1956 |